(12) United States Patent  
Richardson

(10) Patent No.: US 8,746,934 B2  
(45) Date of Patent: Jun. 10, 2014

(54) LIGHTING ASSEMBLY WITH ASYMMETRICAL LIGHT RAY ANGLE DISTRIBUTION

(75) Inventor: Brian E. Richardson, Los Gatos, CA (US)

(73) Assignee: Rambus Delaware LLC, Brecksville, OH (US)

( * ) Notice: Subject to any disclaimer, the term of this patent is extended or adjusted under 35 U.S.C. 154(b) by 235 days.

(21) Appl. No.: 13/294,934

(22) Filed: Nov. 11, 2011

(65) Prior Publication Data

US 2012/0120676 A1 May 17, 2012

Related U.S. Application Data

(60) Provisional application No. 61/456,805, filed on Nov. 12, 2010.

(51) Int. Cl.  
    *F21V 5/00* (2006.01)
(52) U.S. Cl.  
    USPC . 362/327; 362/245; 362/249.02; 362/311.02; 362/555; 362/800
(58) Field of Classification Search  
    USPC .............. 362/235, 244–246, 249.02, 311.02, 362/326–327, 555, 800  
    See application file for complete search history.

(56) References Cited

U.S. PATENT DOCUMENTS

| 6,937,791 B2 | 8/2005 | Guy |
| 6,948,840 B2 | 9/2005 | Grenda et al. |
| 7,163,325 B2 | 1/2007 | Kojima et al. |
| 7,513,642 B2 * | 4/2009 | Sormani ...................... 362/245 |
| 8,061,880 B2 | 11/2011 | Lambert et al. |
| 2005/0207177 A1 | 9/2005 | Guy |

FOREIGN PATENT DOCUMENTS

| JP | 2010-123309 | 6/2010 |
| KR | 10-0972840 | 7/2010 |
| WO | 2007-106020 | 9/2007 |

* cited by examiner

*Primary Examiner* — Jason Moon Han  
(74) *Attorney, Agent, or Firm* — Renner, Otto, Boisselle & Sklar, LLP

(57) ABSTRACT

A lighting assembly that efficiently collects and accurately directs light with a defined asymmetrical light ray angle distribution onto a nearby target surface. The light with the asymmetrical light ray angle distribution illuminates the target surface with a defined illumination profile. In theatrical and architectural lighting, the defined illumination profile is an even illumination profile on a nearly vertical surface. In street lighting, the defined illumination profile is an even illumination profile on a horizontal surface. The lighting assembly includes an LED and a solid reflector optic having a reflective surface shaped to reflect light from the LED in a way that produces the asymmetrical light ray angle distribution at least in part.

22 Claims, 11 Drawing Sheets

LIGHTING ASSEMBLY WITH ASYMMETRICAL LIGHT RAY ANGLE DISTRIBUTION

CROSS-REFERENCE TO RELATED APPLICATIONS

This application claims the priority benefit of U.S. provisional application No. 61/456,805, entitled "Optic System with Even Light Distribution as Projected onto a Surface," filed Nov. 12, 2010. The disclosure of the aforementioned application is hereby incorporated by reference in its entirety.

BACKGROUND

Certain lighting assemblies are configured to evenly illuminate a surface in close proximity to the lighting assembly. Such lighting assemblies are used in applications such as theatrical lighting, architectural lighting, display lighting and sign lighting. In the case of theatrical lighting, this type of lighting assembly is referred to as a cyc (abbreviation for cyclorama) light. In architectural lighting, this type of lighting assembly is referred to as a wall wash. Often, multiple lighting assemblies of this type are arrayed to evenly illuminate a wide vertical surface. For example, in the case of theatrical use, a number of these lighting assemblies are located on the stage to evenly illuminate a vertical surface at the back or the side of the stage. It is desirable to locate these lighting assemblies as close as possible to the vertical surface to allow for actors and or other set pieces to be located close to the vertical surface. In the case of architectural lighting, multiple instances of this type of lighting assembly are typically located at the base of a wall or a sign to provide even illumination from top to bottom. In this application, it is also desirable that the lighting assemblies be located as close as possible to the wall or sign.

Another application for this type of lighting assembly is for street lighting. In such an application, an even illumination of the surface of a street is desired. Illuminating an area evenly with a minimum light level reduces the power needed to provide the illumination. Further, by accurately controlling the direction of the light output from the lighting assembly, glare is reduced.

Light-emitting diodes (LEDs) have become bright enough and low enough in cost to make them attractive as a light source for many lighting applications. However, light-emitting diodes typically output light with a substantially hemispherical light ray angle distribution. Challenges therefore exist in efficiently converting the substantially hemispherical light ray-angle distribution of an LED to the asymmetrical light ray angle distribution needed to evenly illuminate a nearby surface.

DETAILED DESCRIPTION

Figure 1:
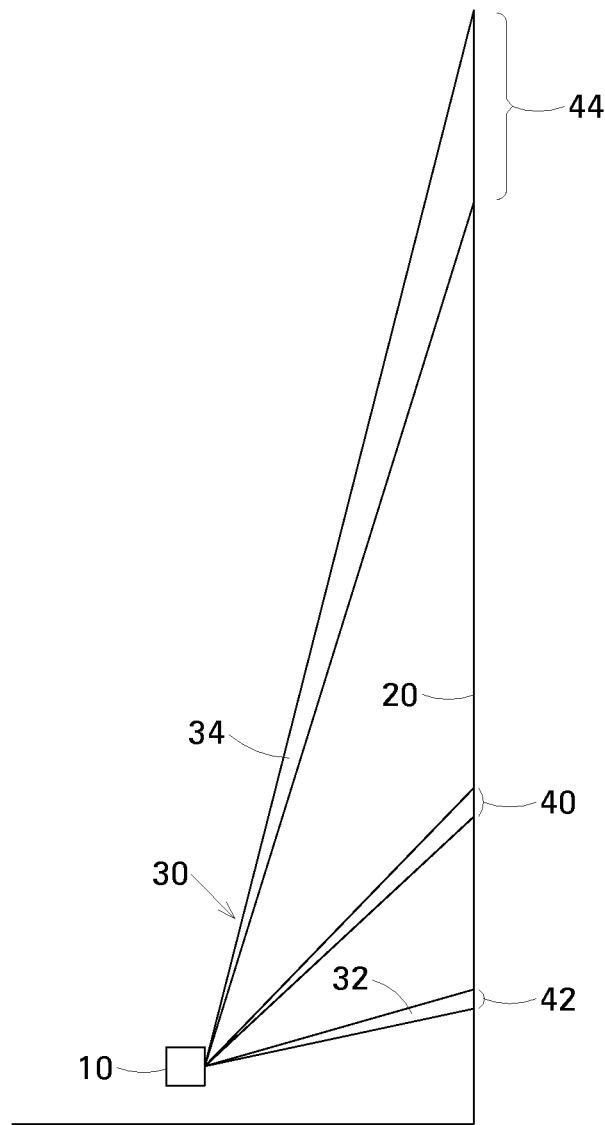
FIG. 1 is a side view showing illumination of a target surface by a nearly lighting assembly.

FIG. 1 is a side view that illustrates the challenge of evenly illuminating a target surface using a lighting assembly located near one end of the target surface. FIG. 1 shows a lighting assembly 10 located near one end of a target surface 20 to evenly illuminate the target surface. The target surface can be regarded as being divided into a number of regions arrayed along the target surface. An exemplary region is shown at 40, and reference numeral 40 will additionally be used to refer to a single region generally and to the regions collectively. Each of the regions 40 subtends an equal angle at lighting assembly 10. The regions progressively increase in size between an exemplary region 42 located near one end of target surface 20 adjacent lighting assembly 10 and an exemplary region 44 located near the other end of the target surface remote from the lighting assembly. The increase in size of the regions is a geometric effect due to the angle of incidence of the light output from lighting assembly 10 progressively increasing between region 42 and region 44. Throughout this disclosure, angles of incidence, angles of reflection and angles of refraction are angles relative to the normal to the surface.

A portion 32 of the output light 30 output by lighting assembly 10 is incident on region 42 of target surface 20 and another portion 34 of the output light is incident on region 44. Output light portions 32 and 34 have equal angular spreads. If lighting assembly 10 were configured to output light 30 with a substantially uniform light ray angle distribution, the resulting illuminance within region 44 would be substantially less than that in region 42 due to the same intensity of light being spread over the larger area of region 44. Light ray angle distribution provides a measure of the variation of the intensity of the output light with ray angle. To illuminate target surface 20 evenly, lighting assembly 10 has to be configured to direct the output light 30 with a light ray angle distribution in which the intensity increases with increasing angle of incidence on the target surface.

Disclosed herein is a lighting assembly that includes a solid reflector optic and a light-emitting diode. The solid reflector optic has opposed major surfaces, and side surfaces extending between the major surfaces. The side surfaces include a first side surface, a second surface and a complexly-curved, reflective side surface. The reflective side surface is a third side surface of the solid reflector optic. The first side surface and the second side surface extend in respective directions from an apex. The reflective side surface is opposite the apex region and extends between the first side surface and the second side surface. The light-emitting diode inputs light into the solid reflector optic through a portion of the second side surface facing the reflective side surface. The light propagates through the solid reflector optic by total internal reflection at the major surfaces.

In some embodiments, the portion of the second side surface facing the reflective side surface includes a light input surface, and the light-emitting diode is located adjacent the light input surface. In other embodiments, the lighting assembly additionally includes a light pipe that extends from the portion of the second side surface facing the reflective side surface to a light input surface. In such embodiments, the light-emitting diode is located adjacent the light input surface. In some embodiments, the light-emitting diode is in optical contact with light input surface of the solid reflector optic or the light pipe to increase the efficiency with which light is coupled out of the light-emitting diode into the solid reflector optic.

The light generated by the light-emitting diode is input to the solid reflector optic directly or via the light pipe and remains within solid reflector optic until it is output from the lighting assembly towards the target surface. The light propagates towards the reflective side surface. The reflective side surface reflects the light towards the second side surface through which the light exits the solid reflector optic towards the target surface. The complex curvature of the reflective side surface is configured such that the light output by the lighting assembly has a light ray angle distribution having greater intensities at small ray angles. Such a light ray angle distribution enables the lighting assembly to evenly illuminate a nearby target surface with the lighting assembly located near one end of the target surface, or to evenly illuminate a street. The second side surface through which light exits the solid reflector optic is shaped such that the light reflected by the reflective side surface is incident thereon at small angles of incidence. Apart from reflection by the reflective side surface, reflections within the light pipe and the solid reflector optic are total internal reflections, which are highly efficient.

FIGS. 2, 3, 4, 5 and 6 show views of an example of an embodiment of a lighting assembly 100 that includes a light-emitting diode (LED) 110, a solid reflector optic 120 and a light pipe 150. Other embodiments, described below, omit light pipe 150. The LED illustrated is a large-die LED sold by Luminus Devices, Inc., Billerica, Mass. Other types of LED are available and may be used. In the example shown, LED 110 is part of an LED assembly 112 that additionally includes a heat sink 114 and power connectors 116. Heat sink 114 supports the LED and dissipates heat generated by the LED. Power connectors 116 provide electrical connections to the LED.

Light-emitting diodes that generate red, green, blue or other colors of light, white light, ultra-violet light and/or infra-red light can be used as LED 110, depending on the intended use of the lighting assembly 100. Some embodiments of LED 110 that generate white light include LED dies that generate red, green and blue light, or include one or more LED dies that generates short-wavelength light and a wavelength converter that converts at least part of the short-wavelength light to light of longer wavelengths. LEDs that differ in physical size and light output from the example shown can be used as LED 110. In other embodiments (not shown), LED 110 includes a number of smaller LED dies that generate light of different colors located in close proximity to one another. The respective currents supplied to the smaller LED dies are controlled to define the color of the light output by LED 110 and, hence, by lighting assembly 100.

Solid reflector optic 120 includes a slab of a transparent material that conducts and guides the light output by LED 110. In the example shown, the solid reflector optic is nominally triangular in shape. Other examples have more than three sides, but such examples have at least one side corresponding to each of the three sides described below. Solid reflector optic 120 has opposed major surfaces 122, 124 (FIG. 5) between which light input to the solid reflector optic propagates by total internal reflection. Solid reflector optic 120 additionally has a first side surface 132, a second side surface 134 and a reflective side surface 136 that extend between major surfaces 122, 124. Side surfaces 132, 134 extend in respective directions from an apex 130. Side surface 136 is located opposite apex 130 and extends between side surfaces 132, 134.

Major surfaces 122, 124 are smooth and nominally parallel to one another. First side surface 132 and second side surface 134 meet at apex 130. In some embodiments, the junction between the first side surface and the second side surface is beveled or chamfered. In such embodiments, an apex will be said to exist at a location where extensions of the first side surface and the second side surface intersect.

Light pipe 150 extends to a light input surface 152 (FIG. 4) from the portion of second side surface 134 of solid reflector optic 120 adjacent apex 130. In the example shown, the light pipe is offset along second side surface 134 from first side surface 132 by a distance that is small compared with the length of second side surface 134. In an example, the offset is less than one-tenth of the length of the second side surface. In other examples, such as that shown in FIG. 11, the light pipe is located substantially at the apex.

In the example shown, the light pipe has a square cross section in a plane parallel to light input surface 152. The light pipe has opposed sidewalls 154, 155 shown in FIG. 4 and opposed sidewalls 156, 157 shown in FIG. 5. In other examples, light pipe 150 has a circular or polygonal cross-sectional shape.

Typically, solid reflector optic 120 and light pipe 150 are respective portions of a solid body of transparent material. Such a construction maximizes the efficiency with which light input to the light pipe is input to the solid reflector optic. In other examples, solid reflector optic 120 and light pipe 150 are separate components of the same transparent material, and the light pipe is affixed to the second side surface 134 of the solid reflector optic using, for example, an optical adhesive. In other examples, solid reflector optic 120 and light pipe 150 are separate components of the different transparent materials, and the light pipe is affixed to the second side surface 134 of the solid reflector optic using, for example, an optical adhesive having a refractive index intermediate those of the materials of the solid reflector optic and the light pipe. When affixing the light pipe to the solid reflector optic, eliminating voids, which reflect light, reduces the loss of light at the junction between the solid reflector optic and the light pipe. Exemplary materials for solid reflector optic 120 and light pipe 150 include glass, polycarbonate and acrylic. Other transparent materials are known and can be used.

Figure 3:
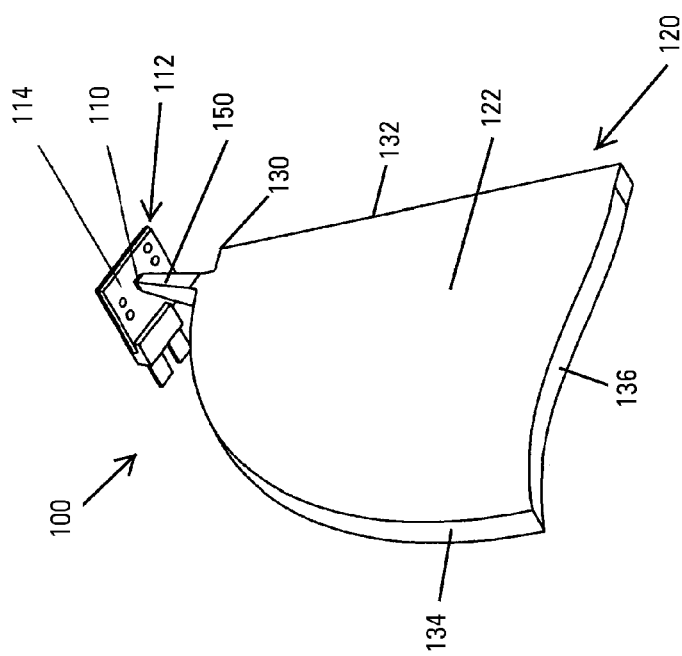
FIG. 3 is another isometric view of the lighting assembly shown in FIG. 2.

FIG. 3 shows LED 110 located adjacent the light input surface 152 of light pipe 150. Mounting the LED in close proximity to the light input surface improves the efficiency with which light output from the LED is coupled to the light pipe: much of the light output by the LED is incident on the light input surface 152 and enters the light pipe. In some embodiments, LED 110 is mounted in optical contact with light input surface 152. An intermediate material having a refractive index greater than that of air may be used to provide optical contact between the LED and the light input surface. An example of a suitable intermediate material is silicone. Optically coupling the LED to the light input surface further increases the efficiency with which light generated within the LED is coupled to the light pipe by locating a material having a higher refractive index than air in optical contact with the high refractive index material of the light output surface of the LED. Reducing the refractive index difference at the light output surface of the LED increases the range of angles of incidence of light that can exit the LED into the light pipe, rather than being reflected back into the LED.

Figure 4:
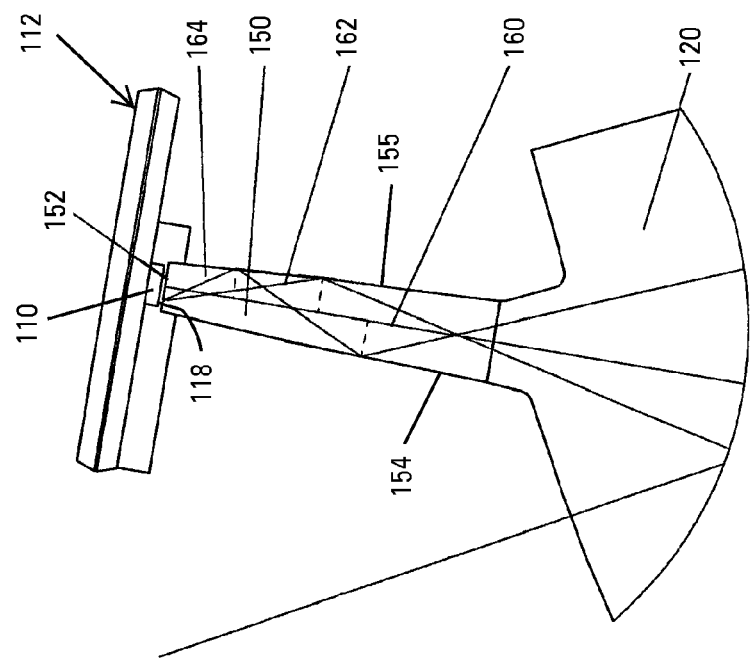
FIG. 4 is an enlarged side view showing exemplary light ray paths in the light pipe of the lighting assembly.

FIG. 4 is an enlarged side view showing light pipe 150 and part of solid reflector optic 120. LED 110 is located adjacent the light input surface 152 of light pipe 150. LED 110 outputs light in all directions within ±90° to the normal to the light output surface 118 of the LED. By locating the light input surface 152 of light pipe 150 in close proximity to the light output surface 118 of LED 110, most of the light from the LED is incident on light input surface 152. As the light from the LED enters the solid material of the light pipe, which has a much higher refractive index than the air in the gap between the light output surface 118 of LED 110 and the light input surface 152 of light pipe 150, the light is refracted towards the normal to the light input surface. The angle of refraction $\theta_r$ of light incident on the light input surface at an angle of incidence $\theta_i$ is given by:

$$\theta_r = \arcsin(\sin\theta_i / \eta_p)$$

where $\eta_p$ is the refractive index of the material of light pipe 150.

For acrylic having a refractive index of 1.485, light incident on light input surface 152 with angles of incidence ranging from +90° to −90° is refracted at respective angles of refraction ranging from +42° to −42°. The refracted light can be said to have a cone angle of 42°, where the cone angle is one-half of the angle between the extreme rays of the refracted light. With a polycarbonate light pipe, which has a higher refractive index, the refracted light has a cone angle of 39°.

FIG. 4 shows an exemplary light ray 160 incident on the light input surface 152 of light pipe 150 at a zero angle of incidence. Light ray 160 passes through the light input surface without refraction and does not change direction as it propagates along light pipe 150. Regardless of the locations on the light input surface 152 at which they are incident, all light rays incident on light input surface 152 at a zero angle of incidence propagate along the light pipe without intersecting the sidewalls 154, 155, 156, 157 of light pipe 150. FIG. 4 also shows an exemplary ray 162 that is incident on light input surface 152 at an angle of incidence of 40°, and is refracted at an angle of refraction of 20°. Light ray 162 is incident the sidewall 155 of light pipe 150 at an angle of incidence greater than the critical angle, and therefore propagates along the light pipe by total internal reflection at sidewall 155.

In the example shown, light pipe 150 is flared such that its width, i.e., the distance between opposed sidewalls 154, 155, increases with increasing distance from light input surface 152. Also in the example shown, the sidewalls 154, 155 of light pipe 150 are slightly curved such that the width of the light pipe increases non-linearly with increasing distance from light input surface 152. The increasing width of light pipe 150 increases the angle of incidence of the light on the sidewalls as the light propagates along the light pipe. An exemplary ray 164 enters light pipe 150 at an angle of refraction of 40° and is totally internally reflected at side walls 154 and 155 as it propagates along the light pipe. Due to the increasing width of the light pipe, the angle of incidence on the side walls increases as the light propagates along the light pipe, and the cone angle within which light is input to solid reflector optic 120 from light pipe 150 is reduced compared with the cone angle within which the light is input to light pipe 150.

In other embodiments, the sidewalls 154, 155 are not curved, and the width of light pipe 150 linearly increases with increasing distance from light input surface 152. In yet other embodiments, light pipe 150 is not flared, and sidewalls 154, 155 are parallel to one another.

Figure 5:
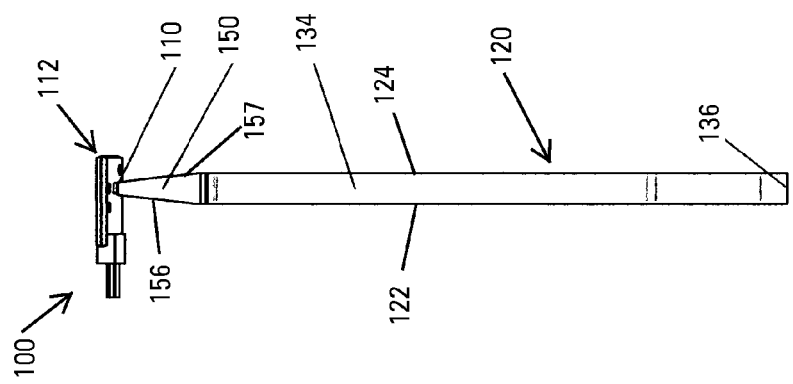
FIG. 5 is a front view showing the lighting assembly shown in FIG. 2.

FIG. 5 is a front view of light assembly 100 showing the thickness of solid reflector optic 120 and light pipe 150. In the example shown, light pipe 150 is flared in the thickness direction similar to the above-described manner in which the light pipe is flared in the width direction shown in FIG. 4. In the example shown, the opposed side walls 156, 157 of light pipe 150 are straight. In other examples, side walls 156, 157 are curved similar to sidewalls 154, 155. Light from LED 110 incident on sidewalls 156, 157 is totally internally reflected, and the increasing thickness of light pipe 150 with increasing distance from light input surface 152 (FIG. 4) increases the angle of incidence on the sidewalls as the light propagates along the light pipe. The increasing thickness of the light pipe reduces the cone angle in the thickness direction within which the light is input from the light pipe to solid reflector optic 120. In other examples (not shown) light pipe 150 is not flared in the thickness direction.

The light input to the solid reflector optic 120 from the light pipe propagates through the solid reflector optic to the reflective side surface 136 thereof directly or by total internal reflection at the opposed major surfaces 122, 124 of the solid reflector optic.

Figure 6:
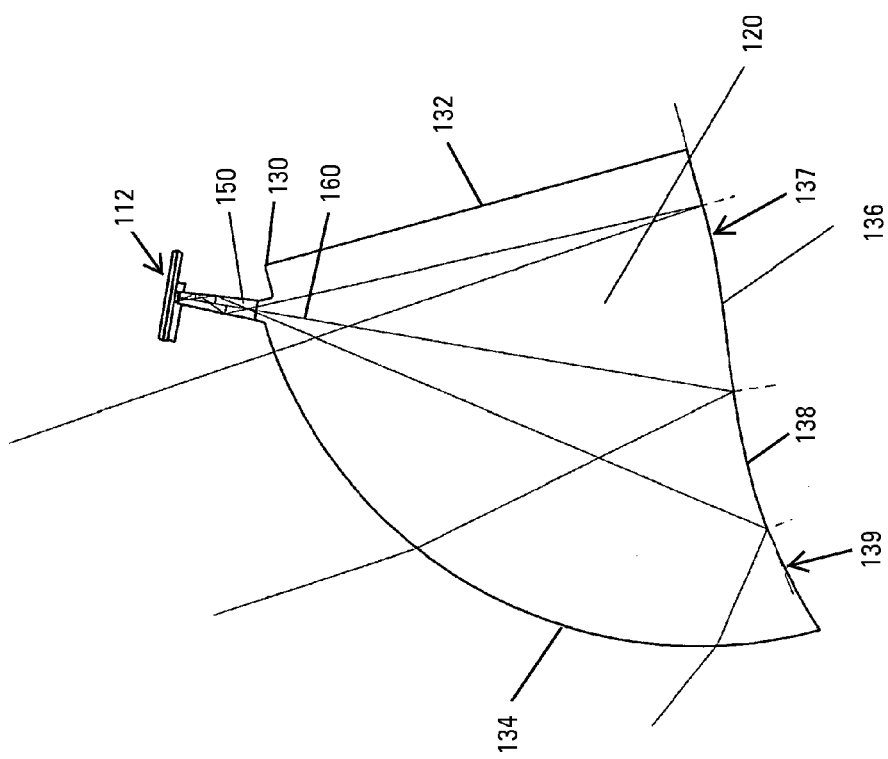
FIG. 6 is a side view showing exemplary light ray paths in the light pipe and the solid reflector optic of the lighting assembly.

FIG. 6 shows an example of light paths within solid reflector optic 120. The cone angle within which the light is input to the solid reflector optic from light pipe 150 is substantially less than the cone angle at which light is output from LED 110. This allows the reflective side surface 136 of solid reflector optic 120 to be substantially smaller than a reflector sized to capture all the light output by LED 110 and propagating to the reflector through air. Thus, propagating the light from LED 110 to reflective side surface 136 through solid reflector optic 120 allows lighting assembly 100 to be substantially smaller than a lighting assembly in which light from the LED propagates to the reflector through air.

The light output from light pipe 150 propagates through solid reflector optic 120 towards the reflective side surface 136 of the solid reflector optic. As noted above, light pipe 150 extends from the second side surface 134 of solid reflector optic 120 close to first side surface 132 and is therefore asymmetrically located with respect to reflective side surface 136. Additionally, the light pipe outputs light in a cone symmetrically disposed about its longitudinal axis, whose direction is the same as that of central ray 160 shown in FIGS. 4 and 6. To ensure that substantially all of the light input to the solid reflector optic from light pipe 150 is incident on reflective side surface 136, the light pipe extends from second side surface 134 in a direction angled towards the first side surface, i.e., in a direction non-normal to the second side surface. The angled direction of the light pipe locates the intersection between reflective side surface 136 and the longitudinal axis of the light pipe at a point offset from the mid-point of reflective side surface 136 towards second side surface 134.

For a given cone angle of the light output from light pipe 150, the light pipe is angled relative to solid reflector optic 120 and reflective side surface 136 is sized such that the light input to the solid reflector optic by the light pipe fills the reflective side surface. Light that fills reflective side surface 136 is incident on substantially all the reflective side surface and any of the light incident on first side surface 132 and second side surface 134 is negligible in intensity. However, a conservative design may make reflective side surface 136 slightly larger than the size needed to provide negligible intensities on side surfaces 132 and 134, but the light input to the solid reflector optic will be regarded as filling such slightly larger reflective side surface.

The reflective side surface reflects the light incident thereon towards the second side surface 134 of the solid reflector optic through which the light exits the solid reflector optic. Lighting assembly 100 is mounted with second side surface 134 facing the target surface so that the light output through the second side surface propagates towards the target surface. The light is incident on the reflective side surface 136 at angles of incidence less than the critical angle. Consequently, reflection at the reflective side surface is not total internal reflection. Third side surface 136 is coated with a reflective coating 138 to increase its reflectivity. In some embodiments, reflective coating 138 is a layer of a reflective metal such as aluminum. In other embodiments, reflective coating 138 is a dichroic reflective coating. Other reflective coatings are known and may be used.

Third side surface 136 is complexly curved to reflect a greater portion of the light incident thereon at smaller ray angles than at larger ray angles. In this disclosure, the ray angles at which light is reflected by reflective side surface 136 are measured relative to the direction of the longitudinal axis of light pipe 150, which is orthogonal to light input surface 152. As noted above, the direction of the light pipe longitudinal axis is the same as that of central ray 160 shown in FIGS. 4 and 6. Smaller ray angles are smaller than larger ray angles. Reflecting a greater portion of the light incident on reflective side surface 136 at smaller ray angles produces the light ray angle distribution needed to evenly illuminate a target surface with lighting assembly 100 located near one end of the target surface. Specifically, the light reflected by reflective side surface 136 at smaller ray angles is incident on regions of the target surface remote from lighting assembly 100. Reflecting a larger portion of the incident light at small ray angles compensates for the larger angle of incidence of this light on the remote locations of the target surface and the consequent larger area of the target surface illuminated by this light. A portion 137 of reflective side surface 136 is concavely shaped to provide this characteristic. Additionally, reflective side surface 136 reflects a smaller portion of the light incident thereon at larger ray angles. The light reflected by reflective side surface 136 at the larger ray angles is incident on regions of the target surface close to lighting assembly 100. Reflecting a smaller portion of the incident light at larger ray angles compensates for the smaller angles of incidence of this light on the nearby regions of the target surface and the consequent smaller area of the target surface illuminated by this light. A portion 139 of reflective side surface 136 is convexly shaped to provide this characteristic.

The light incident on reflective side surface 136 of solid reflector optic 120 has a maximum intensity located approximately where central ray 160 is incident on the reflective side and an intensity that decreases progressively from the maximum along the reflective side surface towards the first and second side surfaces, respectively. The variation of intensity with position on reflective side surface 136 is taken into account in apportioning the light incident on the reflective side surface among the different regions of the target surface.

The light reflected by reflective side surface 136 is refracted as it passes through second surface 134. In some embodiments, second side surface 134 is shaped to minimize the angle of incidence thereon of the various portions of light reflected by reflective side surface 136. In such embodiments, refraction at the second side surface minimally redirects the light reflected by the reflective side surface, and light ray angle distribution of the light output by lighting assembly is mainly defined by the reflective properties of the reflective side surface. In other embodiments, second side surface 134 is shaped such that the various portions of light reflected by reflective side surface 136 are differently refracted at the second side surface. In such embodiments, refraction at the second side surface redirects at least portions of the light reflected by the reflective side surface, and light ray angle distribution of the light output by lighting assembly is defined in part by the reflective properties of the reflective side surface and in part by the refractive properties of the second side surface.

Commercial ray tracing software was used to design the shapes of the reflective side surface 136 and second side surface 134 of a practical embodiment of lighting assembly 100 to provide a defined illumination profile (variation of illuminance with position), such as a uniform illumination profile, on a defined target surface located at a defined distance from lighting assembly 100.

Figure 7:
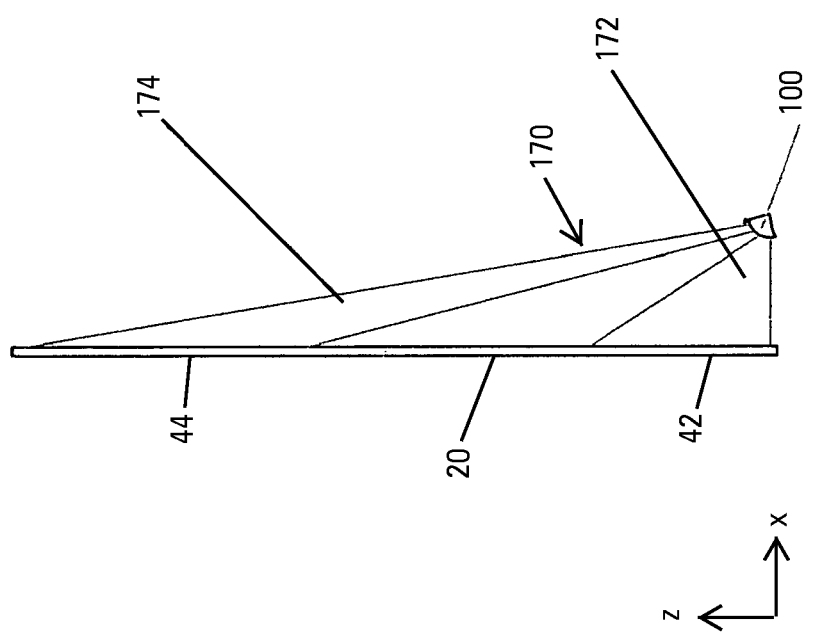
FIG. 7 is a side view showing an example of the lighting assembly used as a cyc light in a theatrical application or a wall wash in an architectural application.

FIG. 7 is a side view showing an example of lighting assembly 100 used as a cyc light to illuminate target surface 20 in a theatrical application or as a wall wash to illuminate target surface 20 in an architectural application. Lighting assembly 100 is located at one end of target surface 20 and is offset from the target surface by a short distance in a direction orthogonal to the target surface. Lighting assembly 100 outputs output light 170 through second side surface 134 of solid reflector optic 120 towards target surface 20. Output light 170 includes a portion 172 output at larger ray angles towards exemplary region 42 adjacent lighting assembly 100 and a portion 174 output at smaller ray angles towards exemplary region 44 remote from the lighting assembly. Other portions of output light 170 are output at progressively larger ray angles towards respective regions of target surface 20 arrayed along the target surface between regions 42 and 44. In an embodiment configured to evenly illuminate target surface 20, the output light portions have respective intensities proportional to the size in the z-direction of the regions of target surface 20 on which they are incident. As used in this disclosure, even illumination is illumination within a defined percentage, e.g., ±20%, ±10%, etc., of the average illuminance on target surface 20. In an embodiment configured to illuminate target surface 20 in accordance with a defined illumination profile, the output light portions have respective intensities proportional to the product of the size in the z-direction of the regions of target surface 20 on which they are incident and the illuminance of the regions as defined by the illumination profile.

The ray angles of the output light portions output at the smaller ray angles need to be accurately controlled because of geometry. A small error in the smaller ray angles will result in uneven illumination of the target surface, or in an output light portion missing the target surface altogether.

Figure 2:
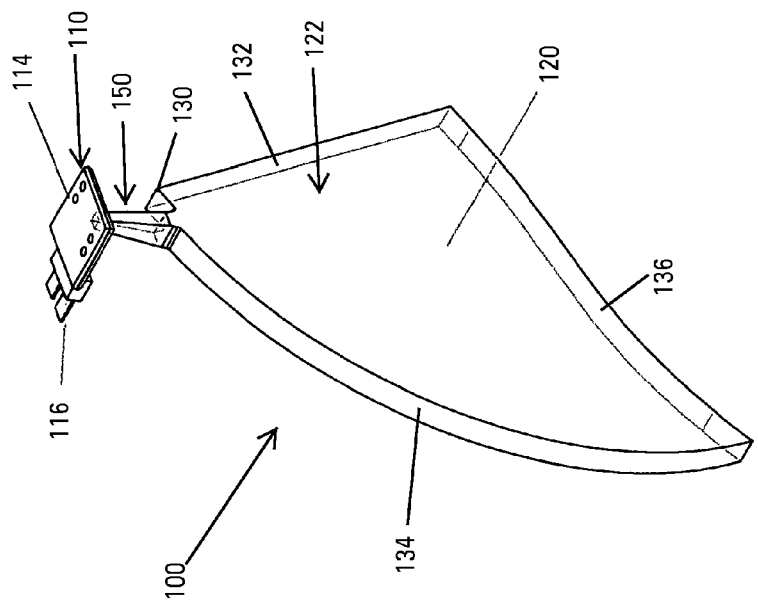
FIG. 2 is an isometric view showing an example of a lighting assembly for producing an asymmetrical light ray angle distribution.
Figure 8:
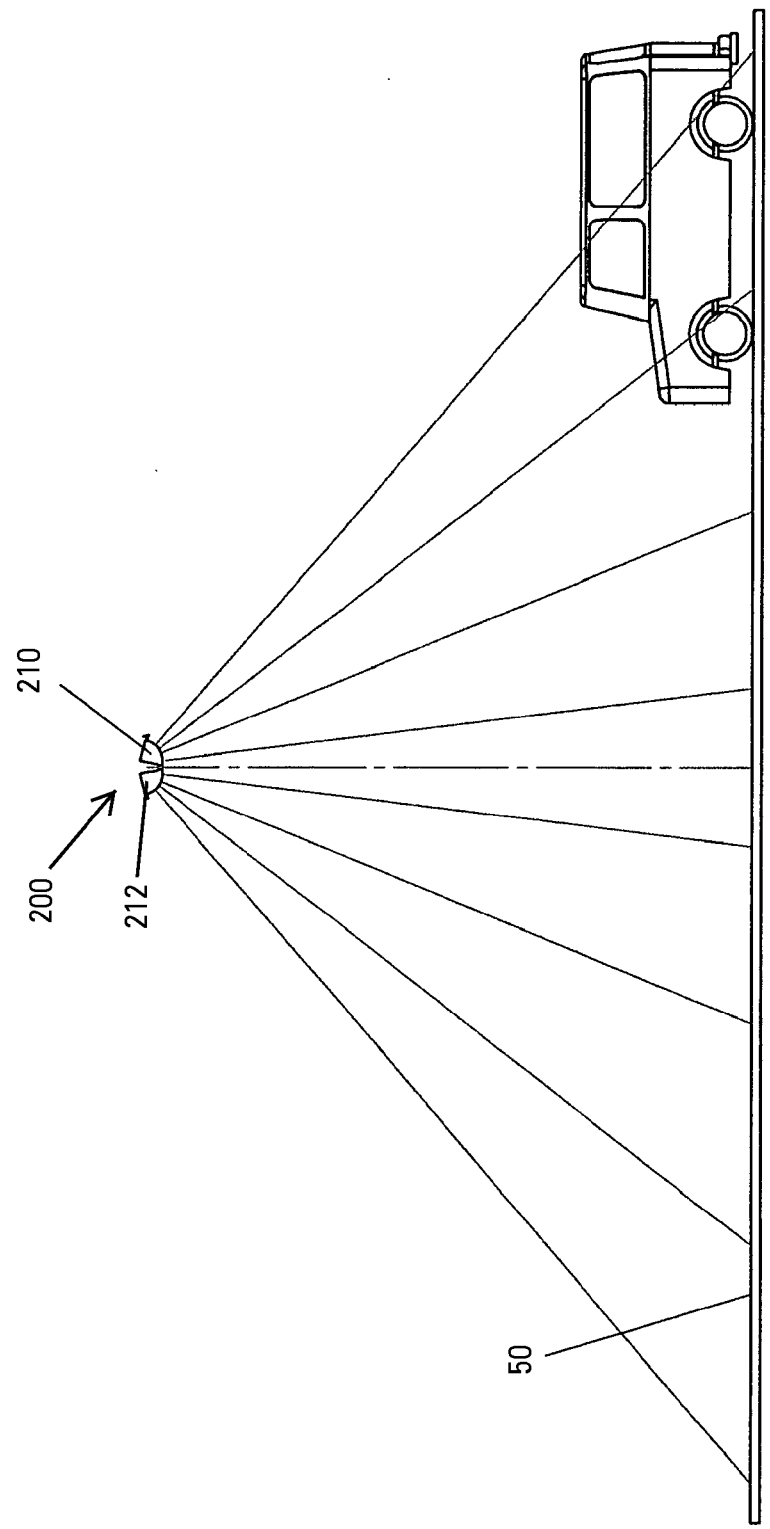
FIG. 8 is a side view showing an example of a street light including two lighting assemblies having similar light ray angle distributions.
Figure 9:
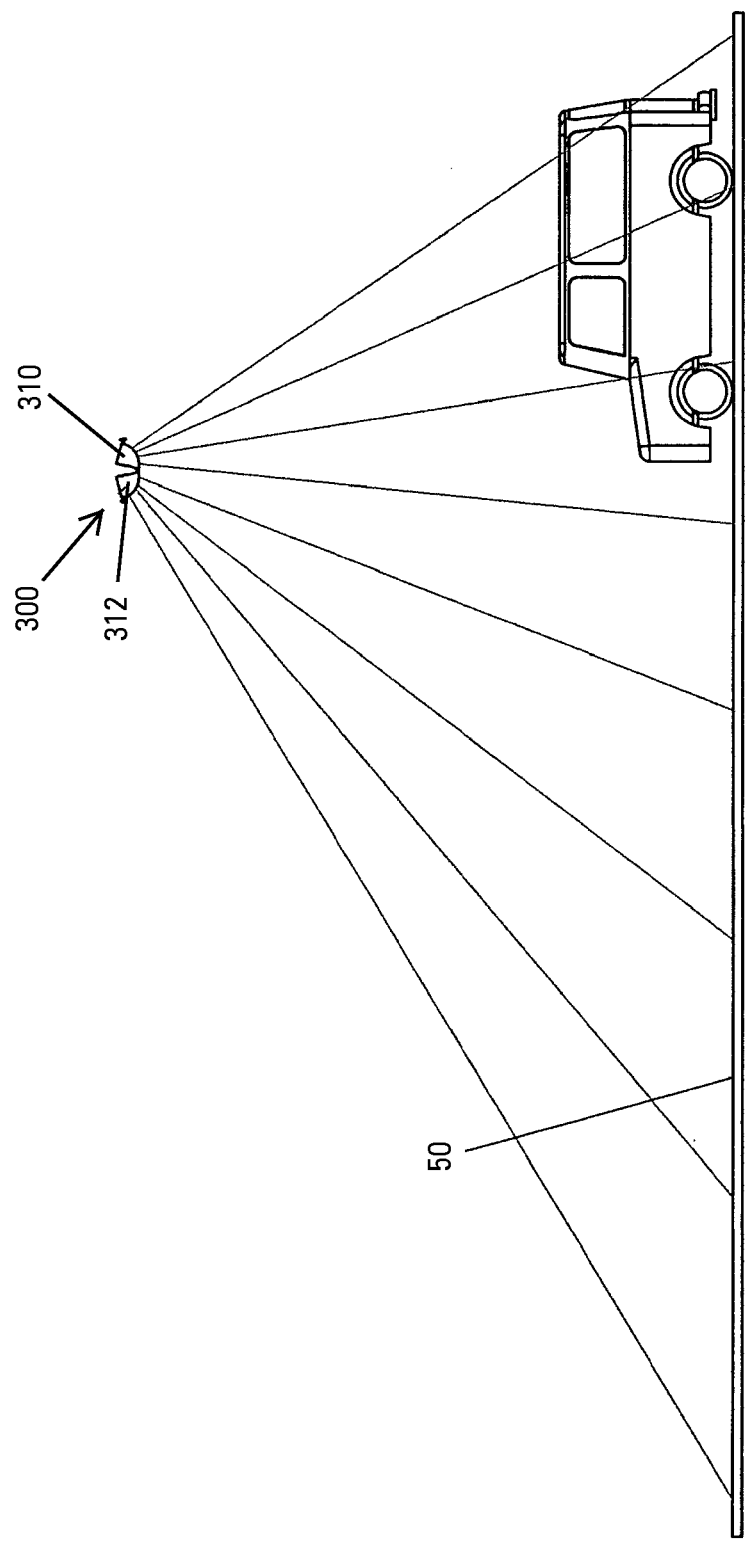
FIG. 9 is a side view showing an example of a street light including two lighting assemblies having different light ray angle distributions.

FIGS. 8 and 9 are side views showing examples of street lights 200, 300 each of which includes two instances of the lighting assemblies described herein. In a street light, the lighting assemblies are is located at a substantially larger distance from the target surface than in the cyc light described above with reference to FIG. 7. As a result, the lighting assemblies used in the street light are configured to output light with a light ray angle distribution having a smaller range of ray angles than lighting assemblies configured for used as a cyc light or wall wash. In the example shown in FIG. 8, street light 200 includes two similar lighting assemblies 210, 212 to direct light both up and down the street. Referring additionally to FIG. 2, each of the lighting assemblies 210, 212 is similar in structure to lighting assembly 100 described above, but differs from lighting assembly 100 in the shape of its second side surface 134 and reflective side surface 136. Specifically, reflective side surface 136 is shaped to reflect more of the intensity of the light input to the solid reflector optic 120 towards smaller ray angles than towards larger ray angles, but the range of ray angles is smaller than in the cyc light application. The range of ray angles is reduced by increasing the smallest ray angle at which a significant intensity of light is output. Lighting assemblies 210, 212 are mounted with their second side surfaces facing street 50.

In the example shown in FIG. 8, lighting assemblies 210, 212 produce output light having equal and opposite light ray angle distributions. In the example shown, the light output from the lighting assemblies has a maximum angle of incidence on street 50 of about 45°. The smaller the angle of incidence, the less likely the light will be seen by the driver as glare. Reducing the maximum angle of incidence on the street requires that the spacing between adjacent poles (not shown) that support the lighting assemblies be reduced, which increases the number of lighting assemblies and, hence, cost. Increasing the maximum angle of incidence reduces the number of lighting assemblies needed but increases the likelihood that drivers will perceive the light as glare.

One way to reduce the likelihood that a driver will perceive the light as glare is to configure the lighting assembly to output light with an asymmetrical light ray angle distribution that has a smaller maximum angle of incidence on the street in the direction of oncoming traffic than in the direction of receding traffic. FIG. 9 shows an example of street light 300 that includes a lighting assembly 310 and a lighting assembly 312 that output light with different light ray angle distributions. Each lighting assembly is similar to lighting assembly 100 described above with reference to FIGS. 2-6, but outputs light with a narrower light ray angle distribution than lighting assembly 100. Lighting assemblies 310, 312 are mounted with their second side surfaces facing street 50.

Glare is mainly a problem for drivers approaching a given street light. A driver is less likely to perceive glare from a street light behind the driver because the driver is looking away from such street lamp. Moreover, the structure of a typical automobile or truck shields the driver from light from a street light located behind the driver. Thus, in the example of street light 300 shown in FIG. 9, lighting assembly 310 that outputs light towards oncoming traffic is configured to output light at a smaller maximum angle of incidence on the street than lighting assembly 312 that outputs light towards receding traffic. The asymmetrical light ray angle distribution of street light 300 provides a reduced likelihood of the light being perceived as glare without requiring a reduced pole spacing.

Figure 10:
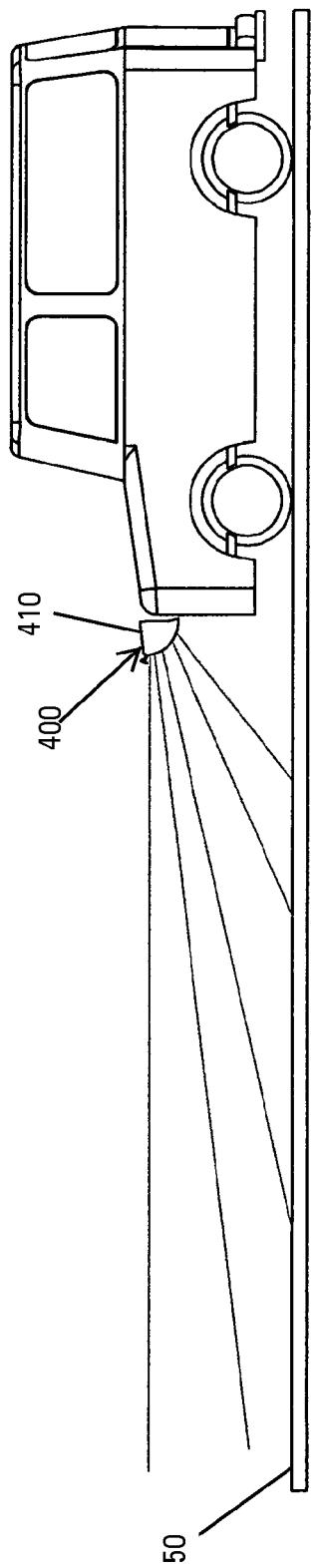
FIG. 10 is a side view showing an example of an automobile headlamp including a lighting assembly.

FIG. 10 is a side view showing an example of an automobile headlamp 400 that includes a lighting assembly 410. Lighting assembly 410 is similar to lighting assembly 100 described above with reference to FIGS. 2-6, Lighting assembly 410 is mounted with its second side surface facing street 50. This orientation of lighting assembly 410 outputs the portion of the output light that is output at smaller ray angles in a near-horizontal direction to illuminate far down the road. Portions of the output light that are output at larger ray angles illuminate regions of the road closer to the automobile.

Referring again to FIGS. 2-6, in some embodiments of lighting assembly 100, light pipe 150 is omitted. In such embodiments, the second side surface 134 of solid reflector optic 120 includes a planar light input surface (not shown) similar to light input surface 152. The light input surface is located at a similar location on second side surface 134 as light pipe 150, i.e., at a location on second side surface 134 at or offset from apex 130 and facing reflective side surface 136. The light input surface is angled relative to a local tangent to the second side surface and reflective side surface 136 is sized such that the light input to solid reflector optic 120 from the light input surface fills reflective side surface 136, as described above. LED 110 is located adjacent the light input surface. In some examples, LED 110 is mounted in optical contact with the light input surface. Typically, in embodiments in which the light input surface is located on second side surface 134, LED 110 is mounted on a smaller heatsink 114 than that shown in FIGS. 2 and 3 to prevent the heatsink from obstructing the output light output through the second side surface.

Light input to solid reflector optic 120 through a light input surface located on second side surface 134 has a cone angle of less than 90° due to refraction at the light input surface. With typical materials of solid reflector optic 120, the cone angle is less than 50°, e.g., approximately 40°. The cone angle of the light input to solid reflector optic 120 from the light input surface located on second side surface 134 is greater than that of the light input to the solid reflector optic from the flared embodiment of light pipe 150 described above with reference to FIGS. 2-6 for the reasons described above with reference to FIG. 4.

Figure 11:
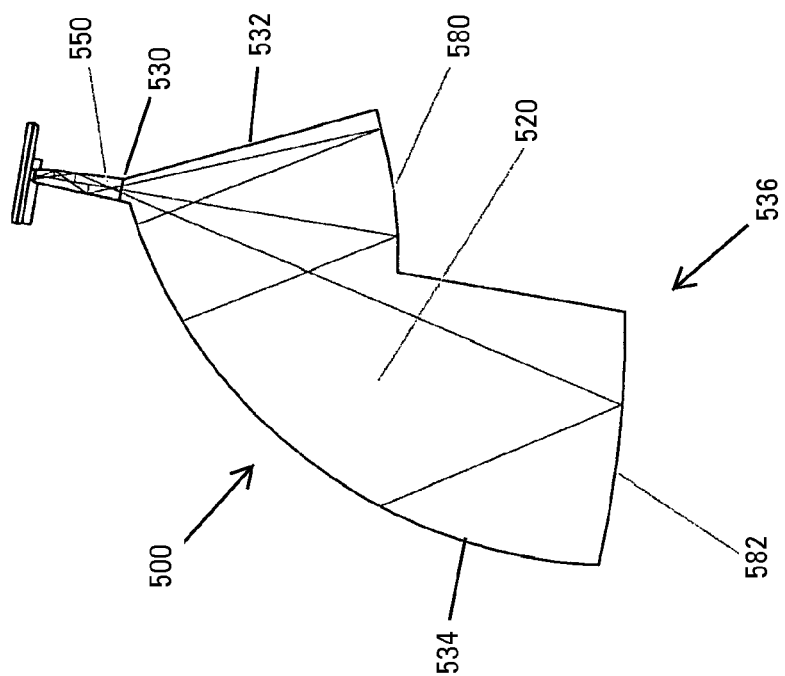
FIG. 11 is a side view showing an example of an embodiment of a lighting assembly having a stepped reflective side surface.

FIG. 11 is a side view showing an example of another embodiment 500 of a lighting assembly. Elements of lighting assembly 500 that correspond to those of lighting assembly 100 described above with reference to FIGS. 2-6 are indicated using the same reference numerals and will not be described again in detail. In lighting assembly 500, the reflective side surface 536 of solid reflector optic 520 is stepped. A portion 580 of reflective side surface 536 adjacent first side surface 532 is closer to apex 530 than a portion 582 of the reflective side surface adjacent second side surface 534. Stepped reflective side surface 536 reduces the overall size of solid reflector optic 520 compared with solid reflector optic 120. The portion 580 of reflective side surface 536 closer to apex 530 reflects light whose directional properties do not need to be accurately controlled, e.g., the light reflected at larger ray angles that illuminates regions of the target surface closer to lighting assembly 500. The portion 582 of the reflective side surface further from the apex reflects light whose directional properties need to be accurately controlled, e.g., the light reflected at smaller ray angles that illuminates regions of the target surface further from the lighting assembly. To reflect a greater portion of the light at the smaller ray angles than at the larger ray angles, portion 580 is smaller than portion 582 so that a smaller portion of the light input to solid reflector optic 520 is incident thereon than on portion 582. In other embodiments (not shown), the reflective side surface has three or more steps to provide the lighting assembly with a desired size and performance.

I claim:

1. A lighting assembly, comprising:
   an entirely solid light-transmissive and planar reflector optic having opposed major surfaces, and side surfaces extending between the major surfaces, the side surfaces comprising:
      a first side surface and a second side surface extending in respective directions from an apex, and
      a complexly-curved, reflective side surface opposite the apex, the reflective side surface extending between the first side surface and the second side surface; and
   a light-emitting diode to input light into the solid reflector optic through a portion of the second side surface adjacent the apex, the input light propagating within the solid reflector optic by total internal reflection at the major surfaces, wherein the reflective side surface is shaped to reflect the input light incident thereon through the second side surface.

2. The lighting assembly of claim 1, in which:

the portion of the second side surface adjacent the apex comprises a light input surface;

the light-emitting diode is adjacent the light input surface; and the light input to the solid reflector optic has a cone angle of less than 90°.

3. The lighting assembly of claim 2, in which the light input to the solid reflector optic has a cone angle of less than 50°.

4. The lighting assembly of claim 3, in which the light input surface is angled relative to the solid reflector optic and the reflective side surface is sized such that the light input to the solid reflector optic fills the reflective side surface.

5. The lighting assembly of claim 2, in which the light-emitting diode is in optical contact with the light input surface.

6. The lighting assembly of claim 1, in which:

the lighting assembly additionally comprises a light pipe extending to a light input surface from the portion of the second side surface of the solid reflector optic adjacent the apex; and the light-emitting diode is adjacent the light input surface.

7. The lighting assembly of claim 6, in which the light pipe has a width that increases with increasing distance from the light input surface.

8. The lighting assembly of claim 7, in which the width of the light pipe increases non-linearly with increasing distance from the light input surface.

9. The lighting assembly of claim 6, in which the light input to the solid reflector optic from the light pipe has a cone angle of less than 90°.

10. The lighting assembly of claim 6, in which the light input to the solid reflector optic from the light pipe has a cone angle of less than 50°.

11. The lighting assembly of claim 10, in which the light pipe is angled relative to the solid reflector optic and the reflective side surface is sized such that the light input to the solid reflector optic fills the reflective side surface.

12. The lighting assembly of claim 6, in which the light-emitting diode is in optical contact with the light input surface.

13. The lighting assembly of claim 1, in which the reflective side surface is stepped, and comprises a first portion adjacent the first side surface and a second portion adjacent the second side surface, the first portion closer to the apex than the second portion.

14. The lighting assembly of claim 1, in which a light pipe is integral with the solid reflector optic.

15. The lighting assembly of claim 1, in which a light pipe is affixed to the second side surface of the solid reflector optic.

16. The lighting assembly of claim 1, in which the reflective side surface is shaped to reflect the input light incident thereon through the second side surface with a light ray angle distribution having higher intensities at smaller ray angles.

17. The lighting assembly of claim 16, in which the second side surface is shaped such that the input light reflected by the reflective side surface is incident thereon at small angles of incidence.

18. The lighting assembly of claim 1, in which the reflective side surface comprises a concave portion to reflect a portion of the input light at smaller ray angles and a convex portion to reflect another portion of the input light at larger ray angles relative to an axis orthogonal to the light input surface.

19. A cyc light, comprising the lighting assembly of claim 1.

20. A street light, comprising the lighting assembly of claim 1.

21. The street light of claim 20, in which:

the lighting assembly is a first lighting assembly;

the street light additionally comprises a second lighting assembly to output light differing in light ray angle distribution from light output by the first lighting assembly.

22. An automobile headlamp, comprising the lighting assembly of claim 1.

* * * * *